United States Patent [19]

McCullough

[11] Patent Number: 5,011,821
[45] Date of Patent: Apr. 30, 1991

[54] METHOD AND APPARATUS FOR GENERATING ELECTRICITY

[75] Inventor: Charley E. McCullough, Peters Township, Washington County, Pa.

[73] Assignee: Westinghouse Electric Corp., Pittsburgh, Pa.

[21] Appl. No.: 341,453

[22] Filed: Apr. 21, 1989

[51] Int. Cl.$^5$ .............................................. H01H 47/00
[52] U.S. Cl. ..................................... 505/1; 322/2 R; 361/141
[58] Field of Search .......................... 361/141; 363/14; 323/360; 322/2 R, 2 A; 307/91; 505/1, 701, 727, 867, 869, 871, 872

[56] References Cited

U.S. PATENT DOCUMENTS

| | | | |
|---|---|---|---|
| 3,088,040 | 4/1963 | Newhouse | 323/36 C |
| 3,310,767 | 3/1967 | Bauchhold | 363/14 |
| 4,385,246 | 5/1983 | Schur et al. | 322/49 |
| 4,626,701 | 12/1986 | Harada et al. | 363/14 |
| 4,904,926 | 2/1990 | Pasichinskyj | 323/362 |

Primary Examiner—Todd E. DeBoer
Assistant Examiner—Jeffrey A. Gaffin
Attorney, Agent, or Firm—E. F. Possessky

[57] ABSTRACT

An electric power generating device includes a bundle of conductors which are placed in a magnetic field generated by north and south pole pieces of a permanent magnet. The magnetic field is shifted back and forth through the bundle of conductors by a pair of thin films of superconductive material. One of the thin films is placed in the superconducting state while the other thin film is in a non-superconducting state. As the states are cyclically reversed between the two films, the magnetic field is deflected according to the Meissner effect back and forth through the bundle of conductors to produce an electromagnetic force.

19 Claims, 3 Drawing Sheets

METHOD AND APPARATUS FOR GENERATING ELECTRICITY

BACKGROUND OF THE INVENTION

1. Field of the Invention The present invention relates generally to electrical power generating devices and, more specifically, to a power generating device which uses superconducting materials to deflect a magnetic field relative to conductive coils and thereby generate electrical power.

2. Description of the Related Art

An electromagnetic force or voltage is induced in a conducting loop or coil when there is relative motion between the conducting loop and a magnetic field. Thus, the production of electric power by electromagnetic means requires that a conductor(s) be in a changing magnetic field. In an arrangement where the poles of the magnetic field are in a vertical plane, and the conductor is in a horizontal plane in the middle of the field, there are three possibilities for producing an electromagnetic force in the conductor: (1) move the conductor sideways, left and right; (2) move the field sideways, left and right; and (3) alternate the flux density of the field through the conductor.

Traditional electromagnetic generators use mechanical energy to move either the field or the conductor. Power standards regarding voltage and frequency are already established, so generator design developments have so far dealt with the quantity of conductors, relative velocity, magnetic flux density, quantity of magnetic poles, etc.

Generally speaking, known electromagnetic power generators are rotary devices and, generally, the design thereof must address the problems of power transmission across a moving interface through brushes, as well as monitoring and maintaining other moving parts such as rotor bearings and output shaft, etc.

Recent developments in the field of superconductivity have led to dramatic increases in the temperature at which superconductive materials achieve a superconducting state. Thus, as a result of these improvements, generally in the form of materials which become superconductive at higher temperatures, it has only recently become of interest to consider practical applications of superconductivity.

Superconductive materials today are generally known as either Type I or Type II. Type I superconductors are primarily the elemental type such as lead and tin, and will exclude an external magnetic field completely when they transition to the superconducting state, but only up to some limit. Type II superconductors exclude completely much weaker magnetic fields than Type I superconductors. As the magnetic field increases in intensity, the field begins to penetrate through the superconductor, but only in small localized "pin holes" or "pins". As the magnetic field increases in intensity, the quantity and density of distribution of these pins also increases.

The Meissner effect is the expulsion of magnetic flux from the interior of a piece of superconducting material as the material undergoes the transition to the superconducting phase. Under controlled conditions, the Meissner effect is reversible in the presence of a magnetic field. In the presence of a magnetic field, with the temperature of the superconducting material above the critical temperature, the field freely penetrates the superconductive material. As the temperature drops below the critical temperature, the superconductive material transitions into the superconducting state and expels the magnetic field. In the foregoing, some work is involved which results in heat being generated. Assuming conductive heat transfer to a heat sink, such as a cryogenic fluid, the heat is removed almost as quickly as it is generated. The greater the density of the flux being moved, the greater will be the heat generated. With a constant heat removal rate, the expulsion rate would likely vary from fast for low magnetic field density to slow at high magnetic field density.

As the temperature rises above the critical temperature, the superconducting material transitions back to the normal state and the magnetic field returns to penetrate the superconducting material volume. Similarly, the superconducting material responds to changes in the magnetic field strength and conducted current, if the temperature is maintained below the critical temperature. For Type I materials, the transition in a zero field at critical temperature is of second order, while the transition in the presence of a field is of first order since there is a discontinuous change in the thermodynamic state of the system and an associated latent heat.

For Type II materials, the transition from the superconducting state to normal with increasing magnetic field strength is not discontinuous in a first order transition at the critical field. Instead, there is an increase in flux penetration which proceeds in discrete jumps starting as the critical field strength is reached. Since the partial flux penetration reduces the diamagnetic energy required to hold the field out, the critical field can be much greater than the thermodynamic critical field.

Generally, the typical Type II superconducting material exhibits a smoother increase in resistance as the critical current density is approached. The effect of increased resistance will be to produce more heat, which in turn may be sufficient to cause the superconducting structure to exceed the critical temperature. A number of Type II superconducting materials are described in Physica 148B (1987), for example, article 224–227 "Superconductive Properties of Single Crystal $YBa_2Cu_3O_x$," by Yasuhiro Iye, et al.

The stability of the superconducting state in the materials discovered so far is relative to three conditions. First, and the primary condition (so far as we know) is that the temperature must be at or below some critical value. Many materials have been produced experimentally and investigated that have a critical temperature above the boiling point of liquid nitrogen (77° K.). One of the more recently discovered materials has a critical temperature of 125° K.

Secondly, in the superconducting state there is a limit to how much current can be conducted. If the conducted current (current density) exceeds some maximum limit, then the superconducting state rapidly reverts to the normal state. The limit is a variable dependent on the temperature of the material and the magnitude of any externally imposed magnetic field. Thirdly, materials in the superconducting state can withstand an externally imposed magnetic field, but as with conducted current, there is a maximum limit. This limit is variable, dependent on temperature and current.

Materials in a superconducting state can withstand greater externally imposed magnetic fields and support greater current densities as the temperature of the material is reduced. Transition time as the material switches from the normal state to the superconducting state, and visa versa, can be very brief.

To date, superconductivity research has been directed to the current-carrying capabilities and transition temperatures of the materials. Few practical applications of superconductivity technology have been attempted.

SUMMARY OF THE INVENTION

An object of the present invention is to reduce or eliminate the moving parts normally associated with conventional devices used for electrical power generation.

Another object of the invention is to utilize the Meissner effect associated with the superconducting state of a superconductive material in order to move a magnetic field relative to a conductor bundle, and thereby generate electricity.

In a preferred embodiment of the invention, an electric power generating device includes a magnetic field source generating a magnetic field, a bundle of conductors disposed in the magnetic field, a pair of magnetic field shunts disposed on opposite sides of the bundle of conductors, each of the pair of shunts including a layer of superconducting material which is normally maintained at a temperature sufficient to maintain a superconducting state thereof, and means for cycling the layers of superconducting material into and out of the superconducting state and out of phase with each other, thereby shifting the magnetic field back and forth across the bundle of conductors to produce an electromagnetic force.

DETAILED DESCRIPTION OF THE DRAWINGS

Figure 1:
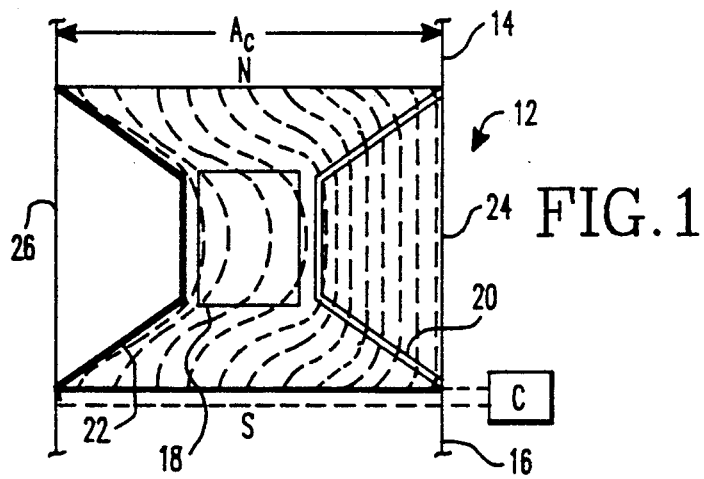
FIG. 1 is a schematic view of a first, preferred embodiment of the present invention, illustrating one of two films of superconductive material in the superconductive state.
Figure 2:
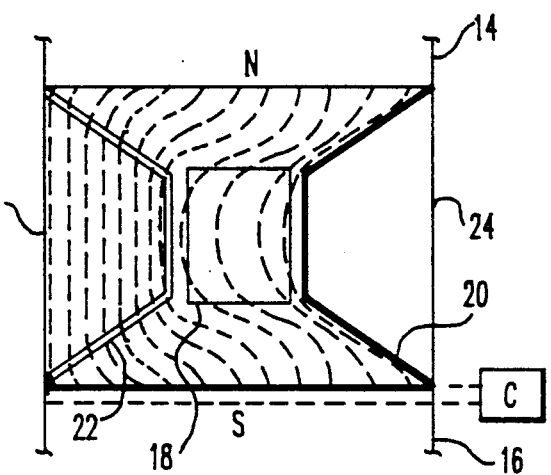
FIG. 2 is a schematic view of the embodiment of FIG. 1, with the superconducting states of the two films of superconductive material reversed.

Referring to FIGS. 1 and 2, an electric power generating device is generally referred to by the numeral 12. FIGS. 1 and 2 represent the same electric power generating device 12 but in different phases of the operating cycle. A magnetic field is represented by the broken lines extending between the north pole piece 14 and the south pole piece 16 of a magnetic field source, such as a permanent magnet. A bundle of conductors 18 is positioned between the north and south pole pieces 14 and 16 and is flanked on opposite sides by two thin films 20 and 22 of superconductive material. Although the films are illustrated as being substantially trapezoidally shaped, other shapes may be employed. In FIGS. 1 and 2, the thin films 20 and 22 are formed on surfaces of support structures 24 and 26 which are likewise trapezoidally shaped. The magnetic field is in an up and down, vertical orientation, with the bundle of conductors 18 oriented horizontally between the pole pieces (FIGS. 1 and 2 are substantially cross-sectional, schematic views). Thus, the superconducting material is located at either side of the bundle of conductors 18 and also in the gap between the poles.

The superconducting material of the thin films 20 and 22 is maintained at a temperature sufficient to obtain the superconducting state and in equilibrium with the magnetic field. One of the pair of superconducting thin films is triggered into the normal, non-superconducting state by the passage of a small amount of current therethrough. The current source and connectors need not be illustrated, and thus, detailed illustrations have been omitted from the drawings, since these are within the purview of the skilled practitioner in the art. However, these components are schematically illustrated in FIGS. 1 and 2 as two broken lines representing connections of the thin films to a controller C which includes a power source for providing a trigger pulse, and a pulse distribution for cycling the trigger pulse back and forth between the two films. Immediately after triggering film 20, the magnetic field is deflected into the volume to the right thereof (see FIG. 1). At the same time, thin film 22 is in its superconducting state and deflects the magnetic field towards thin film 20 and through the bundle of conductors 18. The superconducting thin films 20 and are then cycled into and out of the superconducting states and out of phase with each other such that the magnetic field shifts back and forth across the bundle of conductors 18 and thereby produce an alternating electromagnetic force in the conductors. FIG. 2 illustrates the opposite phase of the operating cycle, in which thin film 20 is made superconductive, thus deflecting the magnetic field from right to left, while thin film 22 is made non-superconductive.

The electromagnetic force produced will be dependent on the flux density, the proportion of the magnetic field that actually moves across the conductors (alternatively, the magnitude of change of flux density seen by the conductors), the velocity of movement of the field relative to the conductors, and the quantity and length of conductors that are traversed by the moving field. In addition, the average electromagnetic force output produced will depend on the number of cycles per second that can be generated.

If the trigger pulse can be terminated just at (or prior to) the onset of the return to the normal state, i.e., prior to the return to normal impedance, then selfheating will be at a minimum and theoretically the material should still be at a temperature at or below the critical temperature required to maintain superconductivity. In this case, the transition from the normal state back to the superconducting state should begin very quickly after cessation of the trigger pulse.

In the embodiment of FIGS. 1 and 2, the support structures 24 and 26 are magnetic field shunts which are each covered with the superconductive thin films 20 and 22. According to the illustrated embodiment, all surfaces of the magnetic field shunts are covered with the thin films, except the outer, parallel surfaces which are coplanar with the outer surfaces of the pole pieces 14 and 16. These exterior surfaces, as well as the magnetic field source, may also be covered with superconductive material to generate different courses of movement of the magnetic field.

A coolant must also be provided as needed, the quantity and type of coolant being determined by the specific superconductive material. The coolant is required to keep the superconductive material at or below the critical temperature threshold. One possible method of maintaining the superconductive states of the two thin films 20 and 22 is to flow the coolant between the north and south pole pieces in surface contact with the thin films.

Figure 3:
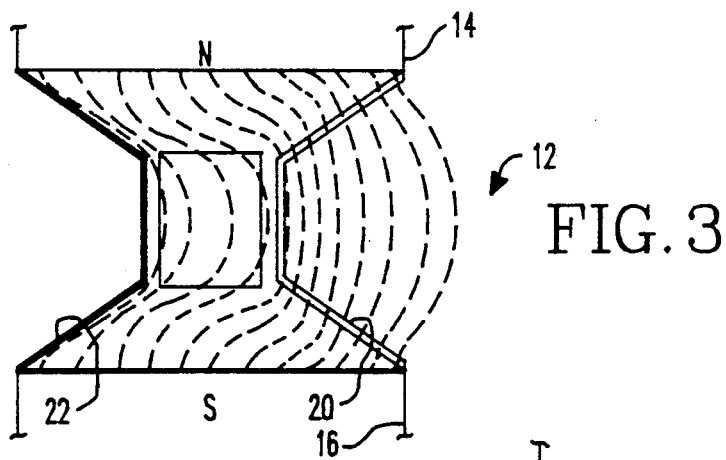
FIG. 3 is a schematic view of a second, preferred embodiment of the present invention showing one of two films of superconductive material in the superconductive state.
Figure 4:
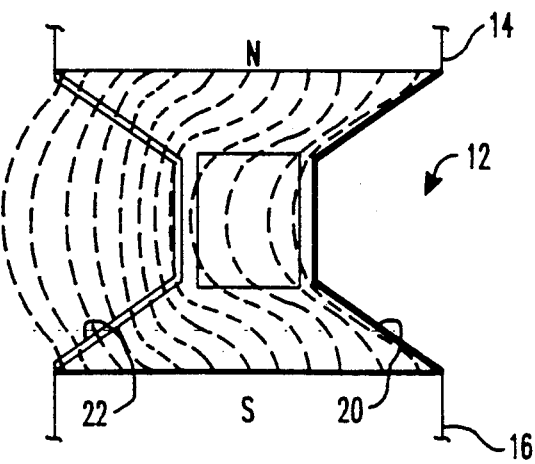
FIG. 4 is a schematic view of the embodiment of FIG. 3 with the superconducting states of the two superconductive films reversed.

When the support structures 24 and 26 are magnetic field shunts, the shunts provide a low impedance magnetic circuit path and assure that a major portion of the magnetic field will be switched back and forth through the conductors. That is, by allowing the field to "pack up" on one side or the other of the bundle of conductors 18, the shunts allow the fringe field to extend further into the center. Moreover, the shunts also retard the movement of the field in an advantageous way. It may allow the field to move at a pace appropriate to the ability of the superconductive thin films 20 and 22 to change state. The embodiment of FIGS. 1 and 2, and the embodiment of FIGS. 3 and 4 are modular designs which make it possible to produce power generator designs from the single user size up to municipal and regional power production size. Outer space applications are also possible, particularly given the use of a heat exchanger system which can produce the necessary low temperature by radiating the excess heat to empty space.

In the embodiment of FIGS. 3 and 4, the design is essentially the same as that for FIGS. 1 and 2, except that the shunt pieces are deleted and the field is allowed to expand to one side or the other in response to the conductivity state of the superconductive elements. The thin films 20 and 22 in the embodiment of FIGS. 3 and 4 are preferably deposited on thin support structures having the same shape as the inner surfaces of the trapezoidally shaped support structures 24 and 26 of FIGS. 1 and 2. Since the thin, support structures used in FIGS. 3 and 4 are made as thin as possible without losing structural integrity, the illustrations of the thin films 20 and 22 are understood to include corresponding support structures. These thin support structures may be made of ceramic materials, which provide non-magnetic, non-conductive substrates. Alternatively, the support structures could be aluminum or copper, both of which are non-magnetic but conductive.

Figure 5:
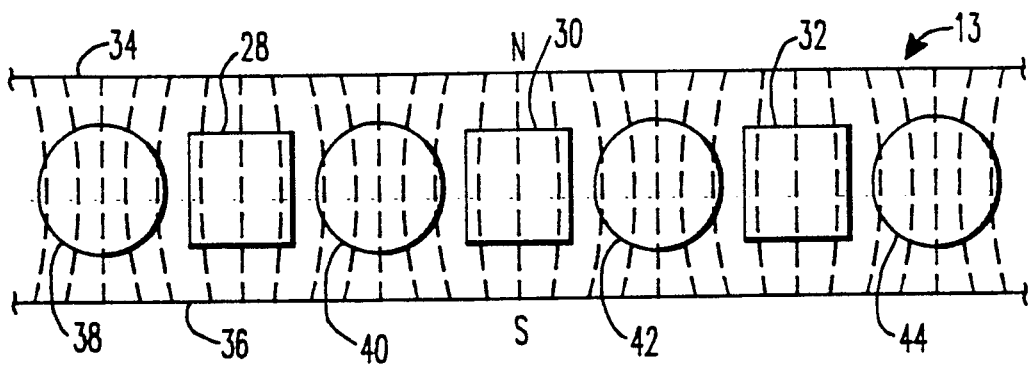
FIG. 5 is a schematic view of a third, preferred embodiment of the present invention, with all superconductive materials in the non-superconducting state.
Figure 6:
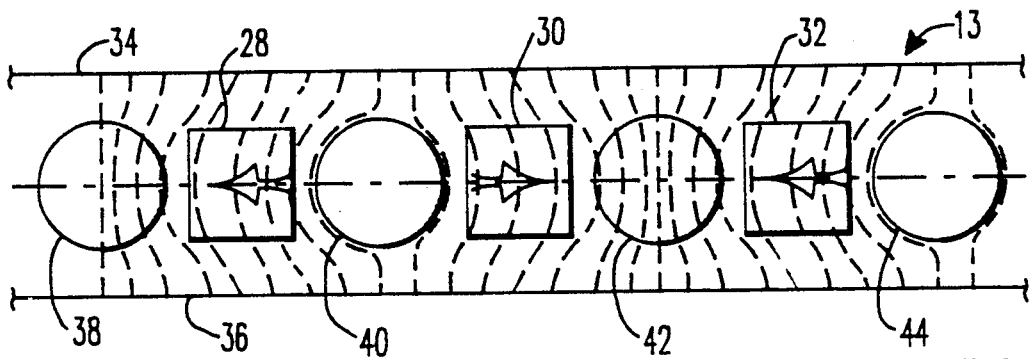
FIG. 6 is a schematic view of the embodiment of FIG. 5, with every other superconductive element placed in the superconducting state.
Figure 7:
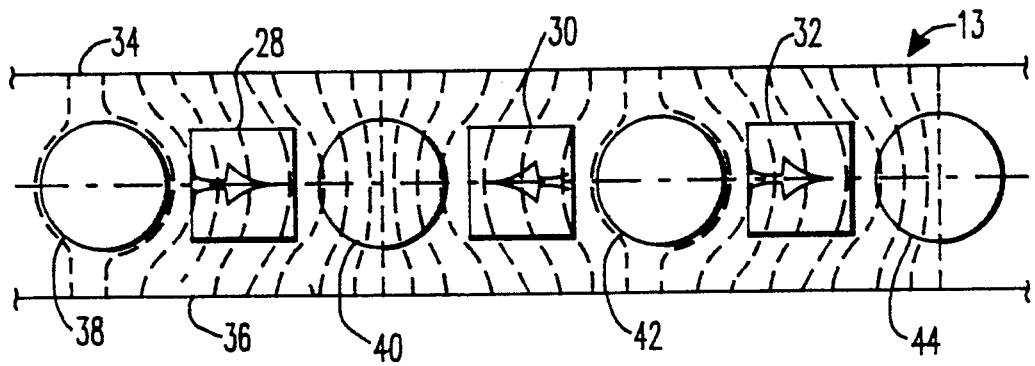
FIG. 7 is a schematic view of the embodiment of FIG. 5 with the state of the superconductive elements of FIG. 6 reversed.
Figure 8:
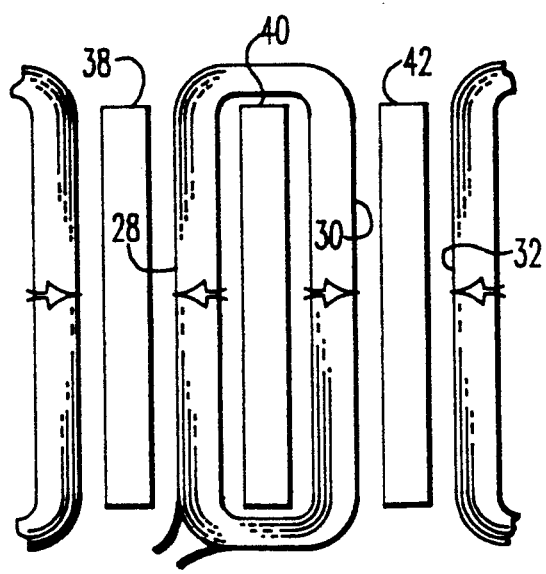
FIG. 8 is a partial, top schematic view of the embodiment of FIG. 5.

A modification of the embodiments of FIGS. 1 and 2, and 3 and 4 is illustrated in FIGS. 5–8. The electric power generating device 13 includes bundles of conductors 28, 30, and 32 which are alternately arranged between north and south pole pieces 34 and 36 with magnetic shunt pieces 38, 40, 42, and 44. Each of the shunt pieces is circular in cross-section and coated with a thin film of superconductive material. In FIG. 5, the superconductive thin films are illustrated in the normal state wherein the magnetic field, represented by broken lines, passes substantially vertically between the north and south pole pieces. In FIG. 6, the superconducting thin films on shunt pieces 40 and 44 are placed in the superconducting state while thin films on shunt pieces 38 and 42 remain in the normal state. (Of course, if necessary to lower the temperature below the critical temperature, a coolant fluid is circulated between the north and south poles of the source of the magnetic field.) This condition is reflected in the movement of the magnetic field in opposite directions away from shunt pieces 40 and 44. In FIG. 7, the films on shunt pieces 38 and 42 have been triggered by the previously described trigger pulse. Thus, FIG. 7 represents the opposite phase of the cycle, wherein the field is repelled in the opposite directions of that illustrated in FIG. 6. By cycling back and forth, the field moves back and forth through the conductors to produce an electromagnetic force. FIG. 8, which is a top view, illustrates how bundles of conductors 28 and 30 can be two halves of the same multi-turn coil, thus making the coil 100% effective.

The embodiment of FIGS. 5–8 would employ a controller similar to the one discussed with respect to the embodiment of FIGS. 1–4. However, the controller would have an output pulse distributed to every other thin film for cycling back and forth as illustrated.

Figure 9:
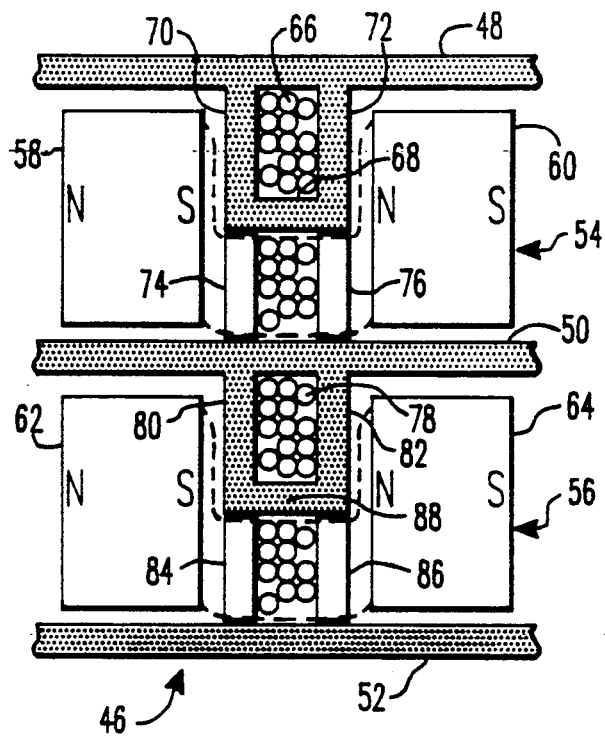
FIG. 9 is a schematic view of a forth, preferred embodiment of the present invention.
Figure 10:
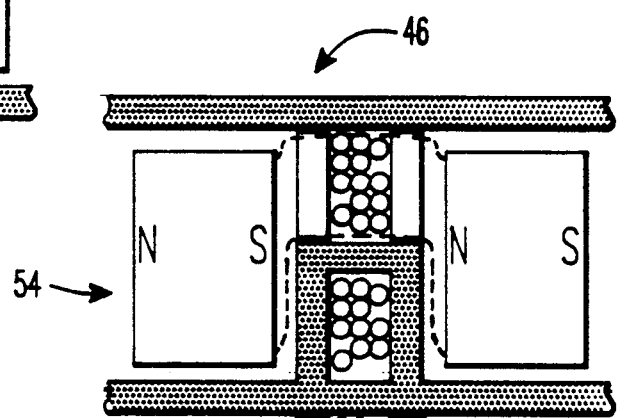
FIG. 10 is a schematic view of the embodiment of FIG. 9, in an opposite phase of its cycle.

Referring to FIGS. 9 and 10, an alternative embodiment is illustrated. An electric power generating device 46 includes three parallel shield plates 48, 50, and 52 which are coated with thin films of superconductive material and placed in a permanent blocking state (by maintaining a temperature at or below the critical temperature of the superconducting material) in order to magnetically isolate two rows 54 and 56 of permanent magnets. Within each row, only two magnets 58, 60 and 62, 64 are illustrated, although it is understood that each row could include as many magnets in a series as is required to achieve a desired output level. The conductors 66 are disposed between the south and north poles of adjacent magnets within a series of plates having superconducting material formed in thin films thereon. A shield plate 68 is placed in a permanent blocking state, while upper window plates 70 and 72 and lower window plates 74 and 76 are triggered into the non-superconducting state by a trigger pulse according to the previously described embodiments. In row 56, a similar arrangement is provided such that conductors 78 are placed between upper window plates 80 and 82 and lower window plates 84 and 86, with a shield plate 88.

In both rows 54 and 56 of FIG. 9, the magnetic field is illustrated to be deflected downwardly as shown by the broken lines. Thus, the upper window plates 70, 72 and 80, 82 are kept in a superconducting state while the lower window plates 74, 76 and 84, 86 are triggered out of the superconducting state to allow the magnetic field to move into the lower region of the conductors 66 and 78. As with the other embodiments, the return to the superconducting state may require heat transfer of coolant fluid in contact with the superconductive thin films or their support structure.

In FIG. 10, the opposite phase of the operating cycle is illustrated, in which the lower window plates 74, 76 and 84, 86 return to the superconducting state while the upper window plates 70, 72 and 80, 82 are triggered out of the superconducting state. The window plates are used to temporarily block the magnetic field and thereby move the magnetic field into and out of the conductors.

Figure 11:
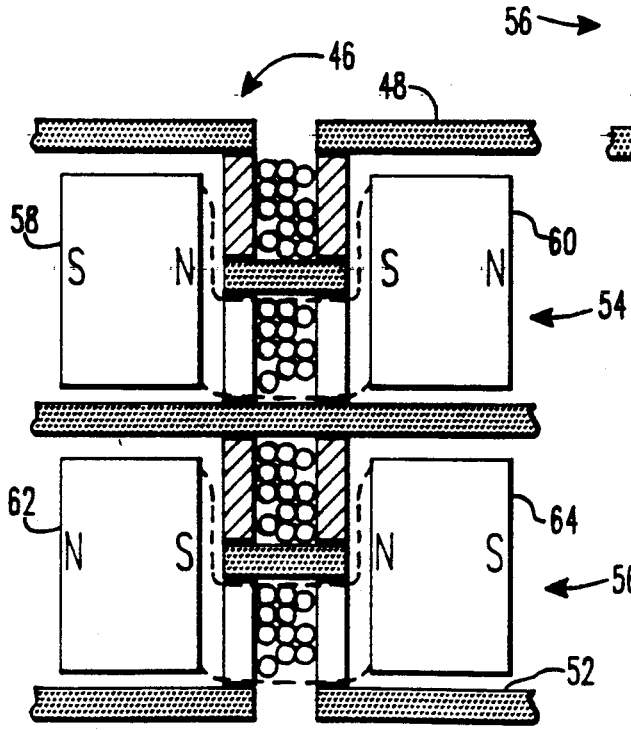
FIG. 11 is a schematic view of a variation of the embodiment of FIGS. 9 and 10.

FIG. 11 is an alternative embodiment in which the shield plates 48, 50, and 52 are broken into segments so as to form gaps over the shield plates. This arrangement is more suitable for cases where the plurality of the magnets 58 and 62 at the ends facing the conductors are reversed.

In the embodiments of FIGS. 9-11, the output will probably appear more sharply peaked. The conductors will experience a flux field that varies from zero to a maximum with very little transition time, and similarly, a transition from maximum to zero. In order to calculate power output, an example follows for a power generating device wherein the bundle of conductors is one half a multi-turn coil(s) with a specified conductor diameter based on the target power output, and where the module is twenty feet long with an active area of gap two inches wide. The width of the gap is the measure from one side of the pole pieces to the other, and is represented in FIG. 1 as the length $A_c$. The cross-sectional area of the gap is 480 square inches (20 ft. $\times$ 2 inches). By knowing the cross-sectional area of a single conductor, and the cross-sectional area available to the bundle, based on the target current, as well as the packing density for the bundle of conductors, power output can be calculated. For our calculations the following parameters were assumed: flux density in the gap is about 5,000 gauss, current limit of 50 amps at a peak voltage output of 120 volts. With the target outputs specified as 120 volts and 50 amps, the system impedance must be 2.4 ohms (120÷50). Using an 8 AWG copper conductor and assuming normal copper conductivity, a conductor length which would have an impedance of 2.4 ohms would be 3,810 feet in length. The module length of 20 feet (240 inches) requires that a single turn in the coil is 480 inches. Therefore, the number of turns based on the calculated length would be 95 turns.

Using the available cross-sectional area for conductors as the controlling criterion, the number of turns in the coil is recalculated. With an 80% density, the recalculated number of turns will be 62 turns. This requires that the conductor will be 2,480 feet long and the simple impedance is 1.56 ohms, where an Awg 8 wire conductor having a resistance of 0.00063 ohms is used. Thus, the output current (for 120 v) is about 77 amps (120÷1.56=76.8 amps).

The output voltage is equal to the product of the flux moved through the volume, the number of turns in the volume, and the number of cycles per second that the flux is forced back and forth through the conductors. Solving to find the oscillation frequency required to maintain an output voltage of 120 volts produces a frequency of 12.6 hertz. Therefore, the twenty foot long module described above could produce 76.8 amps at 120 volts (9.2 kilowatts) if the cycling frequency can be maintained at 12.6 hertz. Naturally, the conductor should be thermally isolated so that self-heating does not boil away any significant amount of coolant. For this purpose, the conductors may be surrounded by a ceramic casing having the square dimensions described above. At cryogenic temperatures copper has a higher conductivity, and consequently smaller gauge conductors could be used to wind a coil with more turns and produce a higher output.

Circulation of current through the module may be accommodated by orienting the 20 foot length of the module vertically, with the coolant entering at the bottom and exiting at the top.

All of the embodiments of the present invention produce an alternating current. As with conventional generators, a solid state gating arrangement can be used to produce a direct current output. The trigger pulse necessary to the present invention to change the state of the superconducting material can be electronically gated by means which are conventional. In order to create the cycling of trigger pulses to the various superconducting thin films, a simple controller can be provided for gating the pulse. The controller may include a current source, a timer, and gating devices. Other means for sending the trigger pulse to the superconducting thin films in the predetermined sequence may be used. Details of the controller, or means for cycling the trigger pulse between the various superconducting films, need not be described herein since such devices and their circuitry are well known.

Permanent magnet materials which are capable of producing high surface flux densities, such as 10K gauss and more, are suitable sources of the magnetic fields described herein.

Shunt structures, when used, can be made of gray iron, which have high permeability and low retentivity of magnetic fields.

While the various embodiments of the present invention have been described with respect to permanent magnets as the magnetic field source, conventional electromagnets or superconducting coils can also be used.

The embodiments described above require no moving parts and are triggered by an electrical pulse. It is also possible to apply the generic concept of the present invention to generators with moving parts (such as a rotating array of superconducting deflectors) or with other trigger sources (such as a heat pulse by a laser or reflected sun light or cycled pumping of a secondary warmer fluid). As long as superconductive structures are maintained at sufficiently low temperatures they will remain in the superconductive state, and within limits, even when the superconductor is conducting an electric current, being subjected to an external magnetic field, or some mix of the latter two conditions. Some superconductors can maintain their superconductive state when the conditions include very intense magnetic fields or very high conducted current densities. Each superconductor has characteristic performance curves relating to the temperature, magnetic field strength, and conducted electric current. The curves show that at temperatures below the critical temperature the combined effects of the external magnetic field and the conducted electric current must be balanced if the superconductor is to remain in the superconducting state. For example, at constant temperature an increase in conducted current must be balanced by a decrease in the magnetic field strength. If the superconductor is in a condition where the temperature, conducted electric current and external magnetic field are balanced at a point just within the limits for the superconductor to remain in the superconducting state, then an increase in the conducted current will trigger the superconductor to transition back to the normal state.

As long as superconductive structures remain in the superconducting state and are within an externally imposed magnetic field they exhibit the characteristic Meissner Effect. This Effect is demonstrated by the expulsion of the external magnetic field from the interior of the superconducting structure. For Type I superconductors the external field is completely expelled as long as the field is less than the critical field ($H_c$). As the value exceeds $H_c$, the superconductor reverts back to the normal state. Conversely, as the value drops below the threshold, the superconductor transitions back to the superconducting state. For Type II superconductors of uniform construction the transition proceeds in two steps. Below $H_{c1}$ the field is completely expelled. As the field increases above $H_{c1}$, and remains below $H_{c2}$, the superconductor remains in the superconductive state but increasingly admits the field into the interior of the superconductor. However, penetration proceeds in discrete jumps and confines the admitted flux into small domains called "pins". As the value exceeds $H_{c2}$ the superconductor reverts to the normal state. As in the case of the Type I superconductor the transitions at the $H_{c1}$ and $H_{c2}$ thresholds are reversible.

A structure can be constructed that provides a relatively large volume entirely covered with a thin layer of a Type II superconductive material. While the superconductive coating is at a temperature below the critical temperature and the external magnetic field is below $H_{c1}$, the external field will not only be excluded from the coating but also from the entire volume within the coating. Displacement of the field from the interior of the shielded volume causes the lines to be deflected to one side or the other of the volume. Deflection of the field may produce some compression of the field. As long as the increased flux density, which is caused by the compression, remains below the $H_{c1}$ threshold the shielded volume will remain free of the external field If a superconductive structure is in a strong magnetic field, and the temperature is just sufficient to maintain the structure in the superconducting state (for the specific magnetic field strength and superconductive material), then there are three things which can cause the superconductor to revert to the normal state:

(1) an increase in temperature;
(2) an increase in the external magnetic field strength; and
(3) the addition of only a small current through the superconductor, preferably as a short duration pulse.

Displacement of the field from the volume of the structure (as the structure transitions to the superconducting state) produces movement of the magnetic field. A conductor placed alongside the superconductive structure will be traversed by the moving field, and consequently a voltage will be induced in the conductor. Of course, this movement of the field also induces a voltage in the superconductor. However, if the conductor is a segment of a multi-turn coil then the voltage induced in the superconductive structure is relatively small when compared with the voltage induced in the conductor.

Regardless, a thin layer of copper or other electrically conductive material can be included in the design to be in intimate contact with the superconductive structure and handle any current flow induced in the superconductive structure at any time that the superconductive structure is not in the superconductive state. That is, at any time that the superconductive structure is in the process of transition between states, or is in the normal, resistive state.

When the trigger current (in the superconductive structure) is discontinued the superconductive structure will return to the superconducting state. A coolant fluid, circulating through the system, removes any heat produced, and assures that any transitions of the superconductive structures to temperatures in excess of the critical temperature are of very short duration. (It is conceivable that with advances in materials technology, critical temperatures could continue to rise and approach room temperature; as the critical temperature rises, coolant requirements will diminish.) Naturally the return may be slightly delayed due to the need to dispose of any extra heat generated by the movement of the field, and of any heat generated by self-heating from the trigger current.

The continued cycling of the superconductive structure between the normal state and the superconducting state causes the external magnetic field to move bidirectionally, first outward as the field is being expelled and then inward as the field is readmitted. The bidirectional movement of the field induces an alternating voltage polarity in the multi-turn coil. If the coil is connected to an electrical load, an alternating current will flow.

Considering the above information it becomes apparent that the process is not directly driven by an input of electrical or mechanical energy since:

(1) the source of the magnetic field can be completely static, i.e., fixed in position and in strength;
(2) the coil can remain completely stationary with respect to the magnetic field source; and
(3) the process can be driven by simply changing the temperature, i.e., a trigger current pulse is not required.

Obviously, the process is thermally driven, and not only that but it requires only an energy sink. Currently, this sink is provided by the use of $LN_2$ as a coolant. Since energy is used in the production of this coolant, the energy loop may now be considered closed, and the process is seen as simply one in which thermal/mechanical/electrical energy input is traded for electrical and thermal energy output. However, in space, where excess heat can be simply radiated away to empty space by efficient heat exchangers the energy cost becomes very elementary, involving primarily only a means to circulate the coolant through the system.

The many features and advantages of the present invention are apparent from the detailed specification, and thus, it is intended by the appended claims to cover all such features and advantages of the electric power generating devices which fall within the true spirit and scope of the invention. Further, since numerous modifications and changes will readily occur to those skilled in the art based upon the disclosure herein, it is not desired to limit the invention to the exact construction and operation illustrated and described. Accordingly, all suitable modifications and equivalents may be resorted to falling within the scope and the spirit of the invention.

What is claimed is:

1. An electric power generating device comprising:
   a magnetic field source generating a magnetic field;
   a bundle of conductors disposed in the magnetic field;
   a pair of magnetic field shunts disposed on opposite sides of the bundle of conductors, each of the pair of shunts including a layer of superconductive material which is normally maintained at a temperature sufficient to achieve a superconducting state thereof; and means for cycling the layers of superconductive material into and out of the superconducting state and out of phase with each other, thereby shifting the magnetic field back and forth across the bundle of conductors to produce an electromagnetic force.

2. An electric power generating device as recited in claim 1, wherein each layer of superconducting material is connectable to a source of electric power for generating a trigger pulse, and the cycling means comprises a controller connected to the source of electric power for the trigger pulse, for alternatingly cycling the trigger pulse through the layers of superconducting material, said trigger pulse being of sufficient magnitude to trigger the superconductive material into a non-superconducting state, and thus to deflect the magnetic field into and out of the bundle of conductors, thereby generating an electromagnetic force.

3. An electric power generating device as recited in claim 2, wherein the magnetic field source is a permanent magnet having north and south pole pieces with a gap therebetween, the bundle of conductors being disposed between the north and south pole pieces.

4. An electric power generating device as recited in claim 3, wherein each of the pair of magnetic field shunts is oriented substantially vertically and comprises a structural support member extending between the north and south pole pieces and having inner and outer surface.

5. An electric power generating device as recited in claim 4, wherein each of the north and south pole pieces has an end surface which defines the gap between the north and south pole pieces, and each structural support member is fitted between the end surfaces of the north and south pole pieces, the two structural support members and the north and south pole pieces defining an interior chamber with the bundle of conductors disposed approximately centrally therein.

6. An electric power generating device as recited in claim 5, wherein the cycling means further comprises a coolant fluid circulating in the chamber to return the layers of superconducting material to superconducting states after cessation of the trigger pulse.

7. An electric power generating device as recited in claim 1, wherein the bundle of conductors comprises one half of a multi-turn coil.

8. An electric power generating device comprising:
a magnetic field source generating a magnetic field;
a bundle of conductors disposed in the magnetic field;
a pair of structural support members disposed on opposite sides of the bundle of conductors, each of the pair of structural support members including a layer of superconducting material which is normally maintained at a temperature sufficient to achieve a superconducting state thereof; and
means for cycling the layers of superconducting material into and out of the superconducting state and out of phase with each other, thereby shifting the magnetic field back and forth across the bundle of conductors to produce an electromagnetic force.

9. An electric power generating device as recited in claim 8, wherein each layer of superconducting material is connected to a source of electric power for generating a trigger pulse, and the cycling means comprises a controller connected to the source of electric power, for alternatingly cycling the trigger pulse through the two layers of superconductive material, said trigger pulse being of sufficient magnitude to trigger the superconducting material into a non-superconducting state, and thus to deflect the magnetic field into and out of the bundle of conductors, thereby generating an electromagnetic force.

10. An electric power generating device comprising:
a magnetic field source generating a magnetic field;
a plurality of bundles of conductors disposed in the magnetic field;
a plurality of magnetic field shunts disposed in the magnetic field alternatingly with the plurality of bundles of conductors, each of the plurality of magnetic field shunts including a layer of superconducting material which is normally at a temperature sufficient to achieve a superconducting state thereof; and
means for cycling the layers of superconducting material into and out of the superconducting state and out of phase with each other, thereby shifting the magnetic field back and forth across the plurality of bundles of conductors to produce an electromagnetic force.

11. An electric power generating device as recited in claim 10, wherein each layer of superconducting material is connectable to a source of electric power for generating a trigger pulse, and the cycling means comprises a controller connected to the source of electric power, for alternatingly cycling a trigger pulse through the layers of superconducting material, said trigger pulse being of sufficient magnitude to trigger the superconductive material into a non-superconducting state, and thus to deflect the magnetic field into and out of the plurality of bundles of conductors, thereby generating an electromagnetic force.

12. An electric power generating device as recited in claim 11, wherein each of the plurality of bundles of conductors is rectangular in shape.

13. An electric power generating device as recited in claim 11, wherein each of the plurality of magnetic field shunts is circular in cross-section.

14. An electric power generating device as recited in claim 13, wherein the plurality of bundles of conductors comprises a plurality of halves of multiturn coils.

15. An electric power generating device comprising:
magnetic field source means for generating a magnetic field;
conductor means disposed in the magnetic field generated by the magnetic field source means;
superconductive shield means disposed in the magnetic field and around the conductor means; and
means for cyclically triggering the superconductive shield means into and out of a state of superconductivity, thereby moving the magnetic field relative to the conductor means and generating an alternating current.

16. An electric power generating device as recited in claim 15, wherein the magnetic field source means comprises a plurality of permanent magnets arranged in two parallel rows, with the polarity of each pair of adjacent magnets in a row being opposite each other, and the conductor means comprises a bundle of conductors disposed between each pair of adjacent magnets of a row, the superconducting shield means comprising a plurality of shield assemblies corresponding to each of the plurality of bundles of conductors, each of the shield assemblies being disposed between two adjacent magnets of a row and having a pair of upper window plates, a pair of lower window plates, and a shield plate disposed transversely between the upper and lower window plates, each of the upper and lower window plates, and the shield plates being covered with a layer of superconducting material.

17. An electric power generating device as recited in claim 16, further comprising coolant means flowing over the upper and lower window plates and the shield plates for achieving a superconductive state thereof, each pair of upper and lower window plates being connectable to a source of electric power which provides a trigger pulse to alternatingly trigger the pairs of upper and lower window plates out of the superconductive state and thereby move the magnetic field between each pair of adjacent magnets relative to the conductors disposed between the upper and lower window plates.

18. A method for generating electrical power comprising the steps of:
   positioning a bundle of conductors in a magnetic field;
   positioning superconductive material on opposite sides of the bundle of conductors; and
   deflecting the magnetic field cyclically back and forth relative to the bundle of conductors by using the Meissner effect.

19. A method of generating electric power as recited in claim 18, wherein the step of deflecting comprises supplying an electric trigger pulse to one of a pair of layers of superconductive material at a magnitude sufficient to render the layer non-superconducting, and switching the trigger pulse to the other of the pair of layers of superconductive material so as to render the second layer non-superconducting, and simultaneously cooling the first layer to a temperature sufficient to return the superconducting state, and cyclically switching the trigger pulse back and forth between the two layers in order to shift the magnetic field back and forth across the bundle of conductors.

* * * * *